United States Patent

Gur et al.

[11] Patent Number: 6,067,372
[45] Date of Patent: May 23, 2000

[54] METHOD AND SYSTEM TO ENHANCE ROBUST IDENTIFICATION OF ABNORMAL REGIONS IN RADIOGRAPHS

[75] Inventors: David Gur; Bin Zheng; Yuan-Hsiang Chang, all of Pittsburgh, Pa.

[73] Assignee: University of Pittsburgh, Pittsburgh, Pa.

[21] Appl. No.: 09/025,435

[22] Filed: Feb. 18, 1998

Related U.S. Application Data

[63] Continuation of application No. 08/605,754, Feb. 22, 1996, Pat. No. 5,838,815.

[51] Int. Cl.$^7$ .................................................. G06K 9/00
[52] U.S. Cl. .......................................................... 382/128
[58] Field of Search ................... 382/128, 130, 382/132, 170, 203, 199, 108, 224, 256, 280; 250/390.02, 341.1, 358.1; 378/37, 98.2, 901; 600/407, 475, 477

[56] References Cited

U.S. PATENT DOCUMENTS

| | | | |
|---|---|---|---|
| 4,203,037 | 5/1980 | Gur et al. | 378/37 |
| 4,515,165 | 5/1985 | Carroll | 600/407 |
| 4,839,807 | 6/1989 | Doi et al. | 382/128 |
| 4,851,984 | 7/1989 | Doi et al. | 382/108 |
| 4,907,156 | 3/1990 | Doi et al. | 382/130 |
| 5,133,020 | 7/1992 | Giger et al. | 382/128 |
| 5,197,484 | 3/1993 | Kornberg et al. | 128/754 |
| 5,212,637 | 5/1993 | Saxena | 600/407 |
| 5,241,472 | 8/1993 | Gur et al. | 382/128 |
| 5,289,374 | 2/1994 | Doi et al. | 382/132 |
| 5,334,851 | 8/1994 | Good et al. | 250/584 |
| 5,343,390 | 8/1994 | Doi et al. | 382/132 |
| 5,349,954 | 9/1994 | Tiemann et al. | 128/634 |
| 5,353,804 | 10/1994 | Kornberg et al. | 128/754 |
| 5,615,243 | 3/1997 | Chang et al. | 378/37 |
| 5,627,907 | 5/1997 | Gur et al. | 382/132 |

OTHER PUBLICATIONS

Karssemeijer, et al, Spatial Resolution in Digital Mammography, Investigative Radiology, May 1993, vol. 28, pp. 413–419.

Nishikawa, et al, Effect of Case Selection on the Performance of Computer–aided Detection Schemes, Medical Physics, Feb., 1994, vol. 21, No. 2, pp. 265–269.

Nishikawa, et al, Computer–aided Detection and Diagnosis of Masses and Clustered Microcalcifications From Digital Mammograms, SPIE, vol. 1905, pp. 422–432.

Wu, et al, Computerized Detection of Clustered Microcalcifications in Digital Mammograms: Applications of Artificial Neural Networks, Med. Phys. May/Jun. 1992, vol. 19(3), pp. 555–560.

Zhang, et al, Computerized Detection of Clustered Microcalcifications in Digital Mammograms Using a Shift–Invariant Artificial Neural Network, Med. Phys. Apr. 1994, vol. 21, No. 4, pp. 517–524.

Stafford, et al, Application of Neural Networks to Computer Aided Pathology Detection in Mammography, SPIE 1993, vol. 1896, pp. 341–352.

(List continued on next page.)

*Primary Examiner*—Jose L. Couso
*Attorney, Agent, or Firm*—IP Group of Pillsbury Madison & Sutro LLP

[57] ABSTRACT

A method and apparatus for detecting abnormal regions in living tissue depicted in a digital radiograph includes identifying suspected abnormal regions depicted in the radiograph and then, for each identified suspected abnormal region, extracting multiple topographic layers of the region from the digital radiograph; determining features of the region in each of the layers; and applying inter-layer multivariate non-linear criteria to the features to determine whether the suspected abnormal region is to be classified as an abnormal region. The distribution of digital values in the digitized radiograph is modified and a probabalistic determination is made as to whether suspected abnormal regions are actually abnormal from multiple analyses. An image is processed using at least two partially correlated detection schemes to produce at least two corresponding result sets of potentially abnormal regions; and the results of the detection schemes are combined using logical "AND" or logical "OR" combining rules to detect abnormal regions in the radiograph.

10 Claims, 8 Drawing Sheets

OTHER PUBLICATIONS

Nishikawa, et al, Computer–aided Detection of Clustered Microcalcifications: An Improved Method for Grouping Detected Signals, Med. Phys. Nov./Dec. 1993, vol. 20(6), pp. 1661–1666.

Chan, et al, Digitization Requirements in Mammography: Effects on Computer–aided Detection of Microcalcifications, Med. Phy. Jul. 1994, vol. 21(7), pp. 1203–1210.

Shen, et al, Application of Shape Analysis to Mammographic Calcifications, IEEE: Transactions on Medical Imaging Jun. 1994, vol. 13, No. 2, pp. 263–274.

Yin, et al, Comparison of Bilateral–Subtraction and Single–Image Processing Techniques in the Computerized Detection of Mammographic Masses, Investigative Radiology 1993, vol. 28, No. 6, pp. 473–481.

Yin, et al, Computerized Detection of Masses in Digital Mammograms: Investigation of Feature–Analysis Techniques, Journal of Digital Imaging 1994, vol. 7, No. 1, pp. 18–26.

Yin, et al, Computerized Detection of Masses in Digital Mammograms: Analysis of Bilateral Subtraction Images, Med. Phys. Sep./Oct. 1991, vol. 18(5), pp. 955–963.

Lai, et al, On Techniques for Detecting Circumscribed Masses in Mammograms, IEEE Transactions on Medical Imaging Dec. 1989, vol. 8, No. 4, pp. 377–386.

Brzakovic, et al, An Approach to Automated Detection of Tumors in Mammograms, IEE Transactions on Medical Imaging Sep. 1990, vol. 9, No. 3, pp. 233–241.

Lucier, et al, Wavelet Compression and Segmentation of Digital Mammograms, Journal of Digital Imaging, Feb. 1994, vol. 7, No. 1, pp. 27–28.

Carl J. Vyborny and Maryellen L. Giger, Computer Vision and Artificial Intelligence in Mammography, AJR:162, Mar. 1994, pp. 699–708.

Philip Strax, M.D., Detection of Breast Cancer, Cancer 1990, vol. 66, pp. 1336–1340.

Heang–Ping Chan, Ph.D., Kunio Doi, Ph.D., Carl J. Vyborny, M.D., Ph.D., Kwok–Leung Lam, Ph.D., and Robert A. Schmidt, M.D., Computer–Aided Detection of Microcalcifications in Mammograms Methodology and Preliminary Clinical Study, Invest Radiol 1988, vol. 23, pp. 664–670.

Maryellen L. Giger, Fang–Fang Yin, Kunio Doi, Charles E. Metz, Robert A. Schmidt, Carl J. Vyborny, Investigation of Methods for the Computerized Detection and Analysis of Mammographic Masses, SPIE 1990, vol. 1233, pp. 183–184.

W. Phillip Kegelmeyer, Jr., Computer Detection of Stellate Lesions in Mammograms, SPIE 1992, vol. 1660, pp. 446–454.

D.H. Davies and D.R. Dance, Automatic Computer Detection of Clustered Calcifications in Digital Mammograms, Phys. Med. Biol. 1990, vol. 35, No. 8, pp. 1111–1118.

D.H. Davies and D.R. Dance, The Automatic Computer Detection of Subtle Calcifications in Radiographically Dense Breasts, Phys. Med. Biol. 1992, vol. 37, No. 6, pp. 1385–1390.

Bahaa W. Fam, M.S., Sherry L. Olson, M.S., Peter F. Winter, M.D., Francis J. Scholz, M.D., Algorithm for the Detection of Fine Clustered Calcifications on Film Mammograms, Radiology 1988, vol. 169, pp. 333–337.

Shun Leung Ng and Walter F. Bischof, Automated Detection and Classification of Breast Tumors, Computers and Biomedical Research 1992, vol. 25, pp. 218–237.

Heang–Pin Chan, Kunio Doi, Simranjit Galhotra, Carl J. Vyborny, Heber MacMahon, and Peter M. Jokich, Image Feature Analysis and Computer–Aided Diagnosis in Digital Radiography. I. Automated Detection of Microcalcifications in Mammography, Med. Phys. Jul./Aug. 1987, vol. 14(4), pp. 538–547.

M.L. Giger, P. Lu, z. Huo, U. Bick, K. Doi, C.J. Vyborny, R.A. Schmidt, W. Zhang, C.E. Metz, D. Wolverton, R.M. Nishikawa, W. Zouras, CAD in Digital Mammography: Computerised Detection and Classification of Masses–Abstract.

R.M. Nishikawa, K. Doi, M.L. Giger, H. Yoshimura, Y. Wa, C.J. Vyborny, R.A. Schmidt, Use of Morphological Filters in the Computerized Detection of Microcalcifications in Digitized Mammograms, Abstract.

Bin Zheng, et al, Computer–Aided Detectio nof Clustered Microcalifications In Digitized Mammograms, vol. 2, No. 8, Aug. 1995, pp. 655–662.

Bin Zheng, et al, Computerized Detection of Masses in Digitized Mammograms Using Single–Image Segmetation and a Multilayer Topographic Feature Analysis, vol. 2, No. 11, Nov. 1995, pp. 959–966.

METHOD AND SYSTEM TO ENHANCE ROBUST IDENTIFICATION OF ABNORMAL REGIONS IN RADIOGRAPHS

This is a continuation of application Ser. No. 08/605,754, now U.S. Pat. No. 5,838,815 filed Feb. 22, 1996.

This application claims priority under 35 U.S.C. § 120 from U.S. patent application Ser. No. 08/352,169 filed Feb. 22, 1996 (hereinafter "Gur") which issued as U.S. Pat. No. 5,627,907 on May 6, 1997 and which is hereby incorporated herein by reference.

1. FIELD OF THE INVENTION

This invention relates to detection of abnormal anatomical regions depicted in radiographs.

2. BACKGROUND

Detection and analysis of target objects in digital images are useful and important tasks. For example, detection and diagnosis of abnormal anatomical regions in radiographs, such as masses and microcalcifications in womens' breast radiographs (mammograms), are among the most important and difficult tasks performed by radiologists.

Breast cancer is a leading cause of premature death in women over forty years old. Evidence shows that early detection, diagnosis and treatment of breast cancer significantly improves the chances of survival, reducing breast cancer morbidity and mortality. Many methods for early detection of breast cancer have been studied and tested, among them mammography. To date mammography has proven to be the most cost effective means of providing useful information to diagnosticians regarding abnormal features in the breast and potential risks of developing breast cancer in large populations. The American Cancer Society currently recommends the use of periodic mammography and screening of asymptomatic women over the age of forty with annual examinations after the age of fifty. Mammograms may eventually constitute one of the highest volume X-ray images routinely interpreted by radiologists.

Between thirty and fifty percent of breast cancers detected radiographically demonstrate clustered microcalcifications on mammograms, and between sixty and eighty percent of breast cancers reveal microcalcifications upon microscopic examination. Therefore, any increase in the detection of clustered microcalcifications by mammography may lead to further improvements in its efficiency in the detection of early breast cancer.

Currently acceptable standards of clinical care are that biopsies are typically performed on five to ten women for each cancer removed. With this high biopsy rate is the reasonable assurance that most mammographically detectable early cancers will be resected. However, reducing the biopsy rate without adversely affecting health is desirable. Accordingly, given the large amount of overlap between the characteristics of benign and malignant lesions which appear in mammograms, computer-aided detection (CAD) of abnormalities may have a great impact on clinical care.

At present, mammogram readings are performed visually by mammographic experts, that is, physicians and radiologists. Unfortunately, visual reading of mammograms has two major disadvantages. First, it is often possible to miss the breast cancer in its early stages. This is because, unlike many other cancers, there is as yet no clear way to detect premalignant changes in the breast. This results partly from the relative inaccessibility of breast tissue. A second disadvantage of visual reading of mammograms is that these readings are both labor intensive, time consuming and subjective. Multiple readings of a single mammogram may be necessary in order to increase the reliability of the diagnosis.

Therefore, it would be advantageous and useful to have computer-assisted or aided detection (CAD) systems to help radiologists and physicians obtain quicker, more consistent and more precise results when performing visual readings of mammograms. Such CAD systems would aid in cancer detection and improve the efficiency and accuracy of large-scale screening.

Various computer-assisted detection systems have been investigated to assist diagnosticians in their diagnosis of breast cancer. To date, research in computerized detection systems for masses and microcalcifications in digital mammograms has largely been based on thresholding methods or neural networks.

Grey-scale morphology has been used in a variety of ways to identify suspicious regions depicted in projection radiographs. ("Morphology" is the study of form and shape.) These prior techniques have been used in conjunction with chest radiographs and mammograms to aid in the identification and classification of normal and abnormal tissues such as solid masses and clustered microcalcifications depicted in those radiographs and mammograms.

Grey-scale morphology-based detection and identification techniques use a gradient or change in a specific single characteristic or variable of an image to identify abnormal tissue depicted in radiographs. These changes are linearly thresholded to discriminate between normal and abnormal tissue, the threshold being determined based on known cases. For example, some techniques use changes in size or shape factors of a particular region as a function of digital value (contrast) to identify abnormal tissue. For a particular region, changes above some linear threshold are considered to indicate abnormal tissue in that region, whereas changes below the threshold are considered to indicate that the region depicts normal tissue.

Other techniques using grey-scale morphology have been based on a feature analysis at the so-called "transition" or "crossover" layer. This transition layer is the growth layer at which a particular feature begins growing out of the background tissue.

These prior techniques first find the transition layer for a suspected abnormal region and then apply a is feature analysis to the image at that layer.

For example, one prior art system takes the approach that by using two variables (namely size growth factor and circularity) at the transition layer and grey-scale morphology, the base of any suspicious region can be determined where the region grows very fast. Then, at only one grey level just above the base or cross-over, a limited set of five or six measures or characteristics are computed. Using linear thresholding only at that single level, a determination is made as to whether or not the region is abnormal.

The use of features from only one level to analyze a growth area, especially from the cross-over level, yields unsatisfactory results since this layer contains more information on background or surrounding regions than on the growth area itself.

Gur disclosed a method and apparatus for detecting abnormal regions in living tissue depicted in a radiograph. Gur finds suspected regions and then uses several top view layers of each suspected region to determine whether or not that region is an abnormal region. A rule-based selection of changes in features is used to select and evaluate suspicious regions.

In Gur, a digitized radiograph is subjected to two stages of processing. In the first or identifying stage, a set of suspicious regions are found in the digitized radiograph. This set of suspicious regions contains some regions that may not contain actual abnormal regions. That is, suspected abnormal regions are identified in the digital radiograph. The second or pruning stage removes false-positive suspected regions found in that first stage. That is, the pruning stage removes suspected regions that are not actual abnormal regions. In the pruning stage, for each identified suspected abnormal region that was found in the identifying stage, multiple topographic layers of that region are extracted from the digitized radiograph and are evaluated to determine whether the suspected region is an actual abnormal region.

Various features of the digitized radiograph are determined for each suspected region. These features are then analyzed and compared to predetermined criteria to determine whether a suspected region is an actual abnormal region. Preferably, at least two adjacent, top-view topographic layers are used.

The features determined and compared include the size, digital value contrast, shape factor and digital value fluctuation of each suspected abnormal region. Gur may include a generated rule-based criteria database, for use in evaluating suspected regions.

Gur's approach achieves good results but these can be improved by the methods and mechanisms described herein.

SUMMARY OF THE INVENTION

In one aspect, this invention is directed to a method and system using a non-linear multivariate multi-layer thresholding rule-based scheme to detect masses and microcalcifications depicted in mammograms.

The method and system is able successfully to discriminate between normal and abnormal tissue depicted in radiographs. A change in relationship between two or more characteristics of a region at different contrast levels is used as the basis for a non-linear threshold.

In one aspect, this invention trains a CAD scheme to discriminate between normal and abnormal tissue depicted in radiographs. Using a database of known (previously diagnosed) images, the invention determines a set of rules to be applied to new images in order to detect abnormalities. Once the CAD scheme is trained, new images can be analyzed.

In the rule-setting phase, each image in the database of known images is processed and data about the abnormalities in each image is collected. Essentially, for each suspected region in each image, first a start point is found within the region. Then a number of layers are extracted around the start point. Next a number of features are measured for each layer. The features include size, shape, longest axis, digital value contrast, standard deviation, skewness, size growth ratio and central position shift.

When all the images have been processed, the change in relationship between two or more features (characteristics) of a region at different contrast levels is considered using a multi-variate, multi-layered approach, and multi-dimensional thresholds are established. These thresholds become the recognition rules for the CAD scheme.

Next, when a new image is to be processed by the CAD scheme, the image is processed to find any suspicious regions and each region is analyzed based on the multi-dimensional thresholds established in the rule-setting phase.

In another aspect, whenever a new image is being processed, the image is subject to repeated analyses after minor modification of the digital values' distribution. Every suspicious region is computed several times (e.g., ten times) after digital values are modified (noise is added or the image is re-digitized). The multiple CAD scheme results are then used as an input to a statistical computation as to whether or not the region is abnormal.

In still a further aspect of this invention, two or more partially correlated CAD schemes are used to increase signal-to-noise ratio. Each new image is processed by at least two not-fully correlated CAD schemes and the results are combined using either a weighted or non-weighted logical "AND" or a weighted or non-weighted logical "OR" rule.

BRIEF DESCRIPTION OF THE DRAWINGS

The above and other objects and advantages of the invention will be apparent upon consideration of the following detailed description, taken in conjunction with the accompanying drawings, in which the reference characters refer to like parts throughout and in which.

DESCRIPTION OF THE PREFERRED EMBODIMENTS

This invention is directed in part to a method and apparatus for detecting abnormal regions in living tissue depicted in a radiograph. Before explaining the presently preferred embodiments of this invention, some background is provided.

Topographic Feature Extraction

Figure 1:
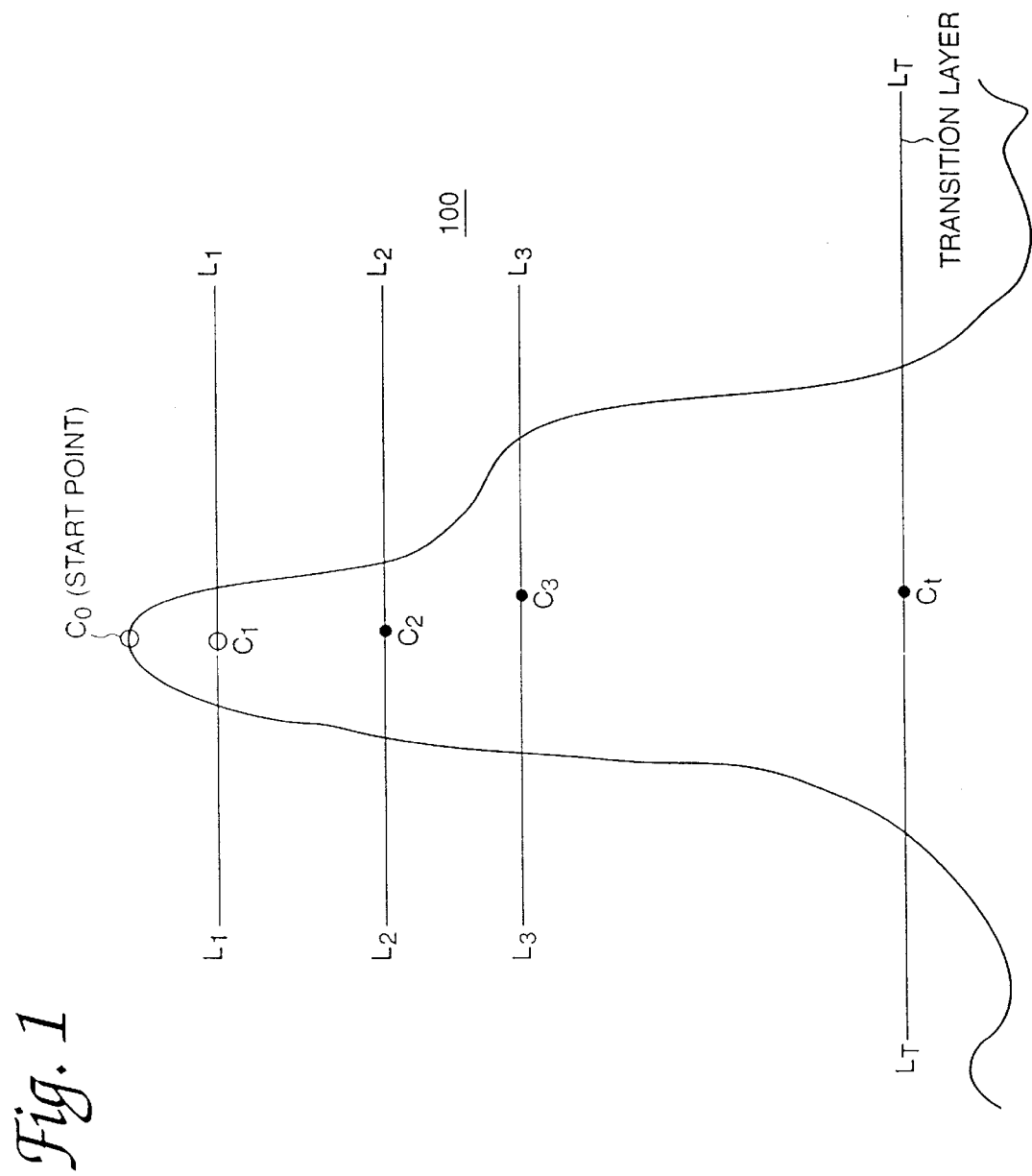
FIG. 1 depicts a side-view cross-section of a region of living tissue.
Figure 2A:
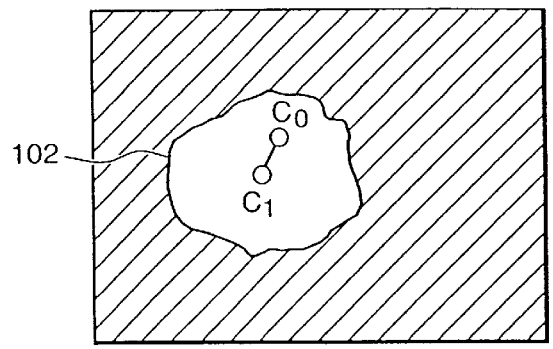
FIGS. 2(a)–2(c) depict top-level views of the region of FIG. 1 at each of three layers.
Figure 2B:
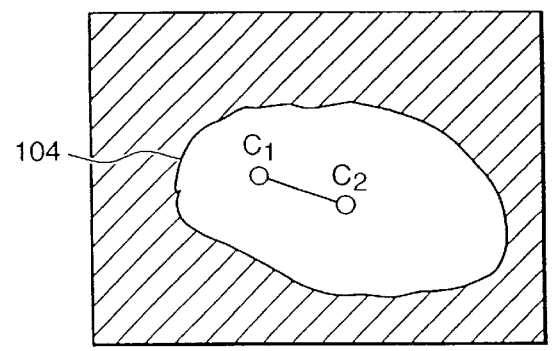
Figure 2C:
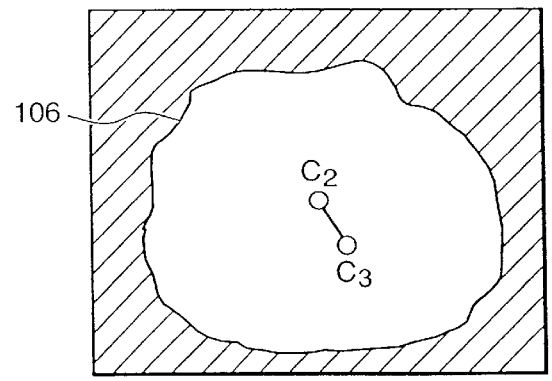

FIG. 1 depicts a cross-section of a region 100 of living tissue. This region may or may not represent an abnormality in the tissue. Note that in the present application of this invention, i.e., in the detection of abnormalities depicted in mammograms, the area of region 100 is relatively small as compared to the area of the entire mammogram. FIGS. 2(a)–2(c) depict top-level cross-sectional views of the region 100 at each of three layers. The top-level sectional view 102 shown in FIG. 2(a) corresponds to a first layer (shown by line $L_1$—$L_1$ in FIG. 1); the top-level sectional view 104 in FIG. 2(b) corresponds to a second layer (shown by line $L_2$—$L_2$ in FIG. 1); and the top-level sectional view 106 in FIG. 2(c) corresponds to a third layer (shown by the line $L_3$—$L_3$ in FIG. 1).

Figure 3:
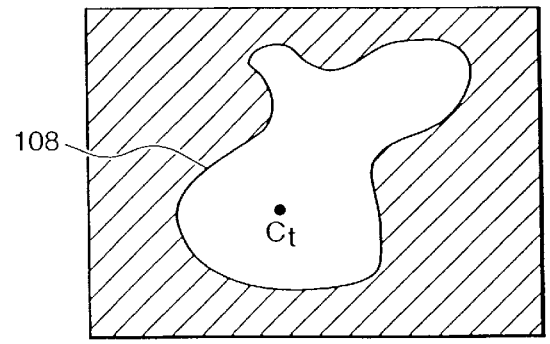
FIG. 3 depicts a top-level view of the transition layer of the region shown in FIG. 1.

In each of FIGS. 2(a) to 3, the shaded (cross-hatched) area is considered the background of the depicted region. In other words, for example, in FIG. 2(a), the non-shaded part inside the area denoted 102 is considered the region under consideration and the shaded part outside the area denoted 102 is considered the background of the region.

For reference, FIG. 3 depicts a top-level view 108 of the transition layer of the region 100 shown in FIG. 1 (shown by the line $L_T$—$L_T$).

For each top-level sectional view of the region 100 (i.e., for each layer of the region 100) various features can be determined. These features include (for the i-th layer):

the size of the region ($V_{i,1}$);

the shape of the region ($V_{i,2}$);

the longest axis ($V_{i,3}$);

the digital value contrast ($V_{i,4}$);

the standard deviation ($V_{i,5}$);

the skewness ($V_{i,6}$);

the size growth ratio ($V_{i,7}$); and the central position shift (relative to the previous layer) ($V_{i,8}$).

Note that the size growth ratio and the central shift position both require information about a previous layer.

For a particular region at a particular layer i, these features are determined as follows:

The size ($V_{i,1}$), is measured by counting the number of pixels on the digital radiograph corresponding to that layer inside the region, and then scaling the measured size (by multiplying by a size coefficient which corresponds to the pixel resolution of the image).

The shape of the region ($V_{i,2}$) is a measure of the circularity of the region.

The longest axis ($V_{i,3}$) is measured by the length of a line inside the region connecting the largest distance between any two points on the boundary of the growth region.

The digital value contrast ($V_{i,4}$) is calculated based on the formula $$C = \frac{I_2 - I_1}{I_2 + I_1}$$

where $I_1$ is the average digital value of the pixels inside the region, and $I_2$ is the average digital value of the pixels in the background.

Some of the features are determined using moments. Measures of moments for use in digital image processing are described in Schalkoff, R. J., *Digital Image Processing and Computer Vision*, John Wiley & Sons, Inc., 1989, pp. 304–307.

The standard deviation ($V_{i,5}$) of a region is computed from the second moment of digital value distribution inside the region. The skewness ($V_{i,6}$) of a region is computed from the third moment of the digital value distribution inside the region.

The size growth ratio ($V_{i,7}$) between two layers $L_i$ and $L_{i+1}$ is calculated by dividing the size of layer $L_{i+1}$ by the size of layer $L_i$.

The central position shift ($V_{i,8}$) is measured relative to the central position of the previous layer and is the difference between the region's center in the two layers. The central position is based on the central moment and is a measure of the regions "vertical centralness." For example, in the region depicted in FIG. 2(c), the central shift position ($V_{i,8}$) is a function of the center $C_2$ of layer $L_2$ and the center $C_3$ of layer $L_3$ (the layer depicted by the section 106 in the drawing). In general, the central shift position of the i-th layer $L_i$ is a function of the central position $C_i$ of the i-th and the central shift position $C_{i-1}$ of the (i–1)-th layer $L_{i-1}$. The start point is considered to be the central position of layer $L_0$.

Extraction of Layers

Extraction of the layers of a particular region of an image being processed for mass detection is as follows. First, two Gaussian low-pass filters with different kernel sizes, seven (7) and fifty one (51) pixels in a preferred embodiment, are used to produce two smoothed images. One of the smoothed images is then subtracted from the other. Simple thresholding is then used to select all suspected pixels in the resulting subtracted image, following which labelling is used to find all connected pixels and form suspected regions. Next, after searching for the local minimal point in each region (the pixel with the lowest digital value), a threshold value is selected and a region growth algorithm is used to find the region's growth area.

The threshold value is automatically adjusted according to the digital value of local minimal point in the region. In general, in order to compensate for the H-D effect of the film exposure and processing, the larger the digital value, the larger the threshold value. The first threshold value helps the computer assisted detection system to measure the image feature in the first layer of the topography. The threshold value for next layer ($T_j$) is the function of threshold value and digital value contrast in the above layer ($T_{j-1}$ and $C_{j-1}$), namely $T_j = T_{j-1} + 256 \times C_{j-1}$.

The threshold value in the next lower layer will be proportionally higher if the digital value of the local minimum point and the digital contrast value calculated in the above layer are higher. Thus, the threshold value of the second layer, $T_2$ is given by $T_2 = T_1 + 256 \times C_1$, and that of the third layer, $T_3$, is given by $T_3 = T_2 + 256 \times C_2$.

The first threshold, $T_1$, of the first layer is determined as follows (to compensate for the H-D effect of film processing):

$$T_1 = I_{min} + I_{min}/10, \quad (I_{min} \leq 500);$$
$$= I_{min} \times 1.0246 + 37.68, \quad (500 < I_{min} < 2000); \text{ and}$$
$$= I_{min} + I_{min}/23, \quad (I_{min} \geq 2000),$$

where $I_{min}$ is the digital value of the minimum point in the suspected region.

System Configuration and Implementation

Figure 4:
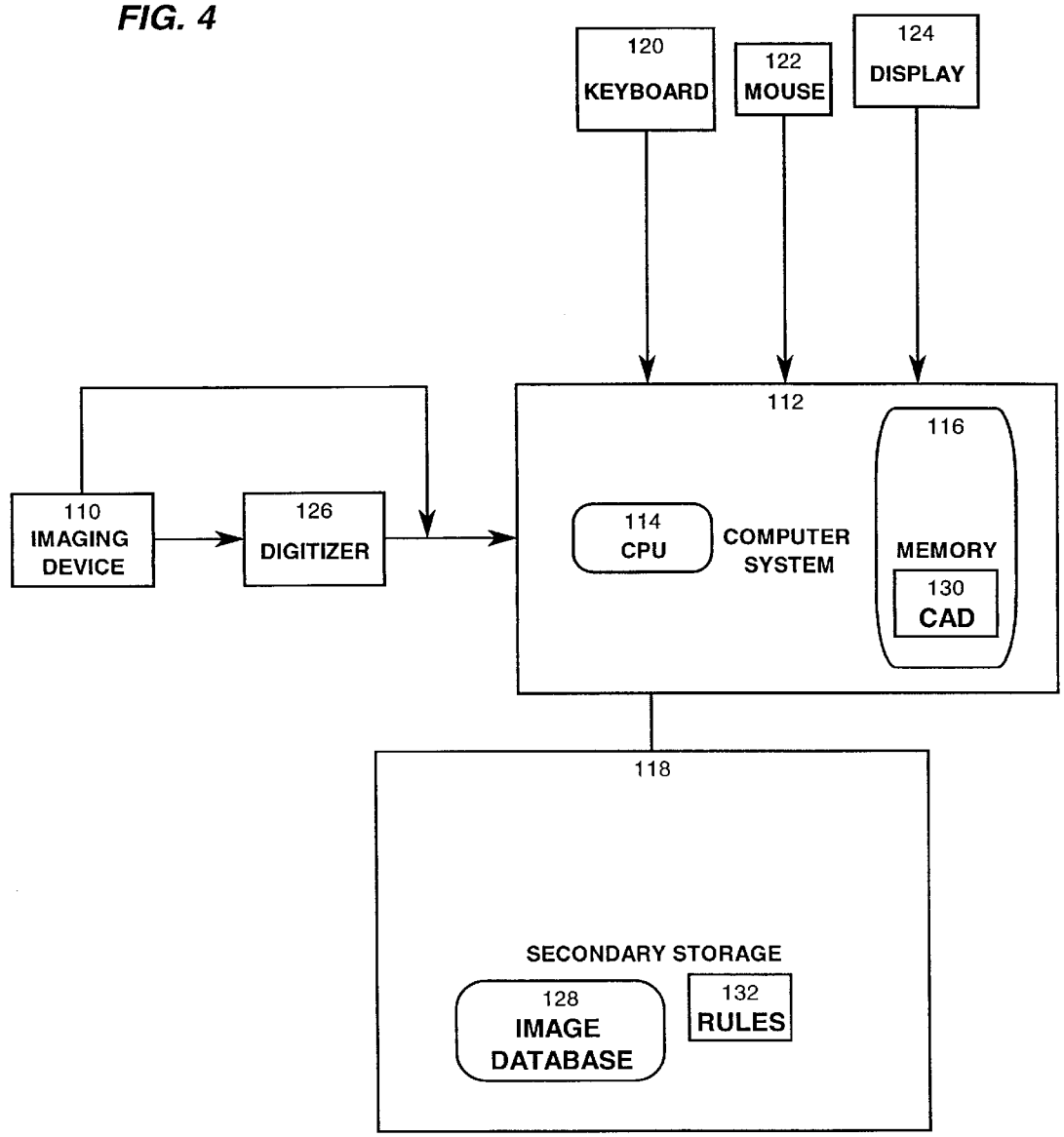
FIG. 4 is a block diagram illustrating an embodiment of the system of this invention.

The present invention has been implemented using a hardware system shown in FIG. 4, wherein an imaging device 110 such as an X-ray mammography device is connected directly or indirectly to a computer system 112 in order to provide the computer system 112 with the image data. The computer system 112 has a central processor (CPU) 114 and a random access memory (RAM) 116. Associated with computer system 112 is secondary storage 118, such as, for example, optical disks, hard disks, etc., for storing programs and image data obtained from imaging device 110. Connected to computer system 112 are various input and control devices, such as keyboard 120 and mouse 122. Display 124 is connected to computer system 112 to display commands, images, and other information produced by the computer system. Various enhanced co-processor chips may be installed into computer system 112 to work in conjunction with the CPU 114 in order to increase the processing power of the computer. An image digitizer 126 is connected either directly or indirectly to computer system 112 in order to provide it with digital image data of the images produced by the imaging device 110.

Secondary storage 118 contains an image database 128 containing digital images that have already been processed by the system. In other words, the images in image database 128 have known results and known clinical status such as the presence or absence of the abnormalities in question.

In operation, the imaging device 110 acquires images of the appropriate anatomical area or part of a human body. In some embodiments, the imaging device 110 is a radiographic or X-ray imaging device capable of producing X-ray mammograms with a resolution of at least 500×500 pixels. These mammograms can be from any view appropriate for detection of abnormalities. Imaging device 110 can generate a direct digital image or provide a mechanism to digitize films. Imaging device 110 may have a separate computer system (not shown) to control its operations for producing radiographs.

Computer system 112 is connected directly or indirectly to the imaging device 110 in order to obtain, store, and analyze the images produced by the imaging device 110. If imaging device 110 does not produce digital images, then digitizer 126, capable of digitizing an image produced by imaging device 110 can be used to provide digital images to the computer system 112.

Because of the high resolution required in order to evaluate digital radiographs, typically, secondary storage 118 is a high capacity storage device, and display 124 is able to display digital radiographic images at a resolution sufficient to enable and assist in their analysis and diagnosis.

In the presently preferred embodiments (at the time this application is being written) a SUN Sparcstation is used as computer system 112. The secondary storage device 118 is either an eight millimeter magnetic tape (for example, 3M eight mm data tape) or an optical disk (for example, Laser-Memory DEC-702 rewritable optical disk, available from Pioneer Communications of America, Upper Saddle River, N.J.). The display 124 is a 21 inch Sun color monitor with a screen resolution of 1100×850 pixels. While the computer system 112 may be directly connected to the imaging device 110, it is also possible for the imaging device 110 to be separated from the computer system 112 and for digital images to be transferred between the two systems by means of some intermediate storage device such as a portable disk (not shown).

A LUMISYS Model 150 laser film digitizer is used as digitizer 126. The scanning pixel size of the LUMISYS digitizer is selectable in the range 50×50 $\mu m^2$ to 200×200 $\mu m^2$, and the gray level of the digitization is twelve (12) bits. For the embodiments described herein, the size of the laser focal spot and scanning pixel size were set to 100×100 $\mu m^2$.

The software of the present invention implemented on computer system 112 can be written in any suitable high level computer language. In the present embodiment, the software is written in a combination of the programming languages C and C++. Further, while aspects of the present invention have been implemented in software running on a computer system as described above, all aspects of the present invention can also be implemented in hardware.

Operation

There are two phases to the operation of this invention, namely a rule-setting phase wherein a CAD scheme is optimized using a database of known images and a use or application phase wherein new images are analyzed by the CAD scheme.

Rule Setting Phase

In a first or rule-setting phase a CAD scheme 130 executing on computer system 112 is optimized, using a database of known or verified images, e.g, image database 128. Each image from the image database 128 is processed in turn, after which the results are analyzed to obtain the rules 132 (2-D and 3-D non-linear thresholds) for subsequent image processing.

Figure 5:
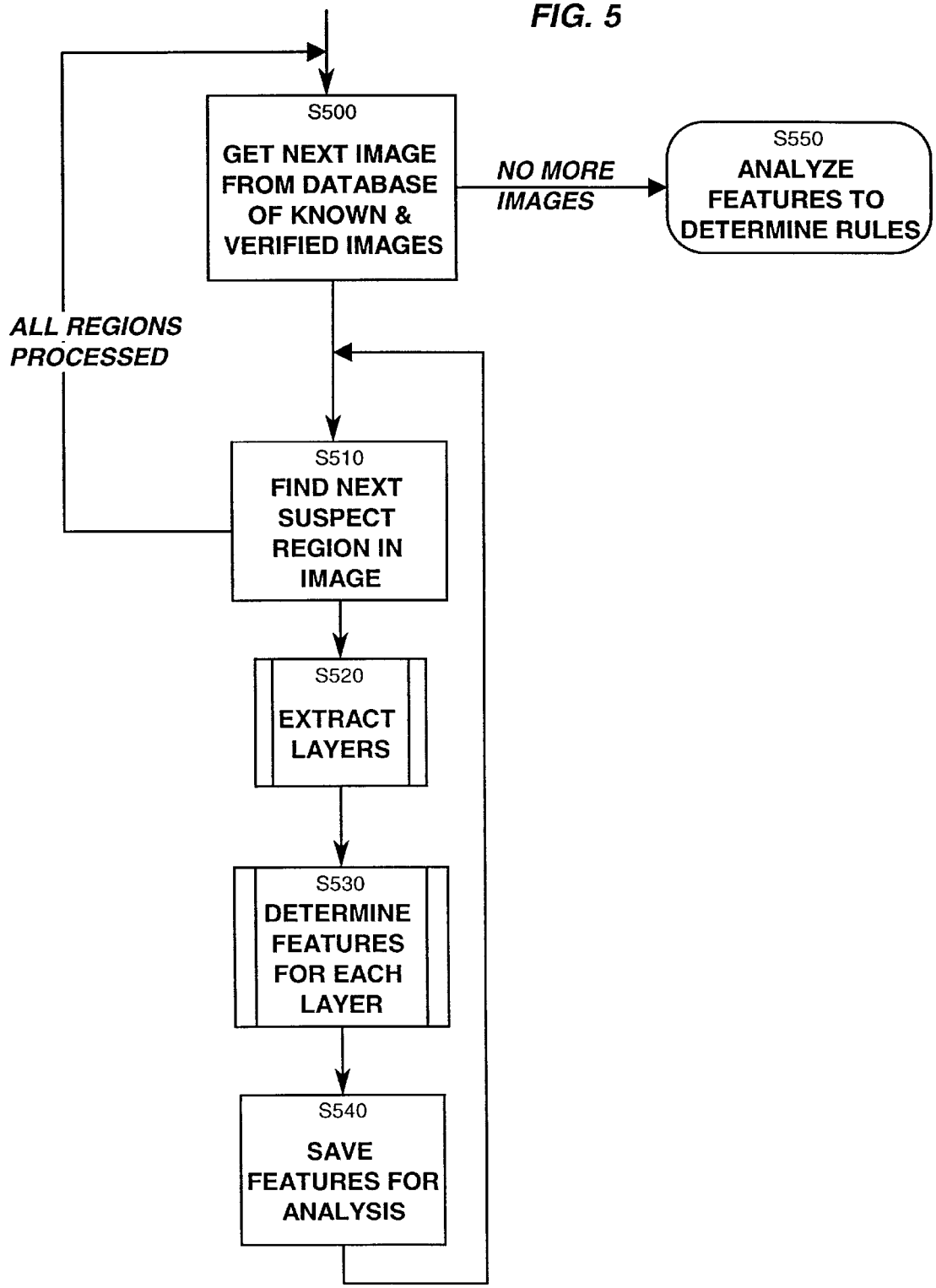
FIGS. 5, 6, 7, and 8 are flowcharts showing the operation of the present invention.

Rule setting is described here with reference to FIG. 5, wherein, while there are still more images in the image database 128, an image is obtained for processing (step S500). Next, suspicious regions are found and the image is segmented accordingly (step S510).

At this stage the criteria for finding suspicious regions are not generally strict, therefore these found suspicious regions may contain many false-positive regions. That is, the found suspicious regions include regions which do not contain a mass or any microcalcifications.

Next, the list of suspicious regions are pruned using multilayered topographic feature analysis to remove false-positive regions. The pruning stage uses a rule-based criteria database (132 in FIG. 4) in order to determine whether or not a particular suspicious region is a true positive region. The rule-based criteria database 132 is determined separately and prior to using the system for a particular diagnosis. The database is stored in the computer system 112, for example in secondary storage 118, although it can be stored elsewhere (for example, in a ROM) or built into the program. Rules can be added to the database, and rules in the database can be modified as more accurate tests are determined.

The step of finding suspicious regions can use any known method of finding suspicious regions. For example, the method described in Gur can be used. For example, in one preferred embodiment, only one input radiograph is used to find the suspicious regions. In another preferred embodiment, two input radiographs are used. That is, one preferred embodiment uses single image segmentation techniques, whereas another preferred embodiment uses bilateral-image subtraction techniques.

Having determined a list of suspicious regions for the current image and the segmented image, each of these suspicious regions is then processed as follows:

For the current suspicious region of the current image, a number of layers are extracted, preferably three) (step S520) and features are determined for each of the layers (step S530). Preferably eight (8) features are determined, including size, shape, longest axis, digital contrast, standard deviation, skewness, size growth ratio and central position shift of the suspicious region. That is, for each extracted layer $L_i$, i=1 to 3, measure eight (8) features ($V_{i,1}$ to $V_{i,8}$) for that layer.

The features are then saved (step S540) for subsequent analysis (in step S550). Once an image has been processed and the features saved, the next image is processed (step S500).

If, in step S500, there are no more images remaining in the image database 128 then processing is complete and the saved image features are analyzed to determine the rules (step S550).

Determining the Rules

Once all the features have been obtained for all images in the image database 128, the rules can be determined as follows:

Various features and groups of features are compared with the true-positives (recall that the image database 128 contains known, i.e., previously diagnosed and verified images) in order to determine various thresholds rules.

For example, two variables, the contrast ($V_{i,4}$) and the standard deviation ($V_{i,5}$) for each layer i are compared with the actual true-positives. If a correlation is found between any two of these variables, then a non-linear curve (boundary condition) is determined relating the two variables and the true-positives. In a preferred embodiment (as described below), a non-linear rule relating the contrast and the standard deviation in the third layer was determined.

Similarly, boundary conditions are determined between the same variable in different layers and different variables in different layers.

For example, in one embodiment, analysis of the standard deviation in each layer ($V_{i,5}$) and the longest axis in each layer ($V_{i,3}$) shows a significant non-linear relationship between the standard deviation in the first layer and the longest axis in the second layer.

Note that the actual rules or boundary conditions can change as new cases are added to the image database 128.

Note too that rules or boundary conditions for one type of abnormality need not be the same as those for another type of abnormality. Further, the rules for one type of exam (such as an X-ray) may differ from the rules for another (such as computed tomography). Thus, for example, the rules for detection of masses may not be the same as the rules for detection of clustered microcalcifications. Similarly, the rules for masses in mammograms may differ from the rules for masses in computed tomography of the liver.

Applying the CAD to a New Image

Figure 6:
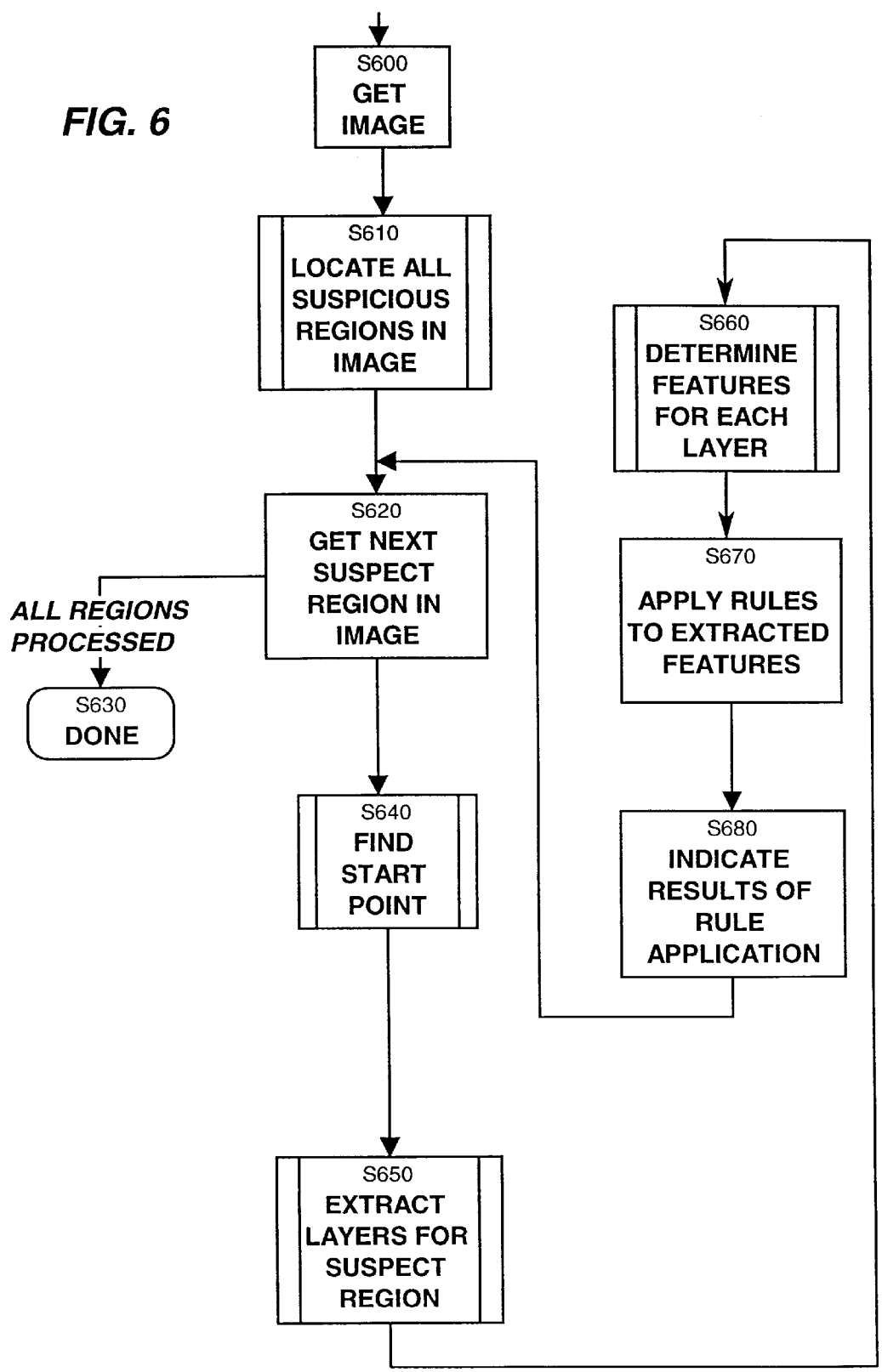

Assuming that the rules database 132 (FIG. 4) has already been setup (i.e., optimized), for example, with the twelve rules listed above. Then, a new image is analyzed as follows (with reference to FIG. 6):

First, an image is obtained (step S600) and all suspicious regions in the image are found (step S610). As with the rule setting phase described above, various techniques of finding the first list of suspicious regions can be used.

Having found suspicious regions (in step S610), the list of suspicious regions is pruned to remove false-positives. That is, each suspicious region is processed (step S620). If all suspicious regions for this have been processed then processing is complete (step S630), otherwise processing continues as follows:

A start point $S_0$ for the region is found (step S640) and then a number of layers, preferably at least three, are extracted (step S650). For each extracted layer, features for that layer are measured (the features can include size, shape, longest axis, contrast, standard deviation, skewness, size growth ratio and central position shift of the suspicious region and should be the same features that were determined during the rule-setting phase (in step S530)). That is, for each extracted layer $L_i$, i=1 to 3, measure eight (8) features ($V_{i,1}$ to $V_{i,8}$) for that layer (step S650). In preferred embodiments, at the end of this step there is a vector of eight features for each of the three layers for this region.

Next, applying the previously determined rules 132 (determined in the rule-setting phase) to the extracted features, it is determined whether or not this suspicious region does represent an abnormality in the living tissue depicted in the radiograph (step S670).

The results of this application of the rules (step S680) are indicated, for example, on display 124.

The processing continues with the next suspicious region (if any remain) (step S620).

EXAMPLE

Figure 9A:
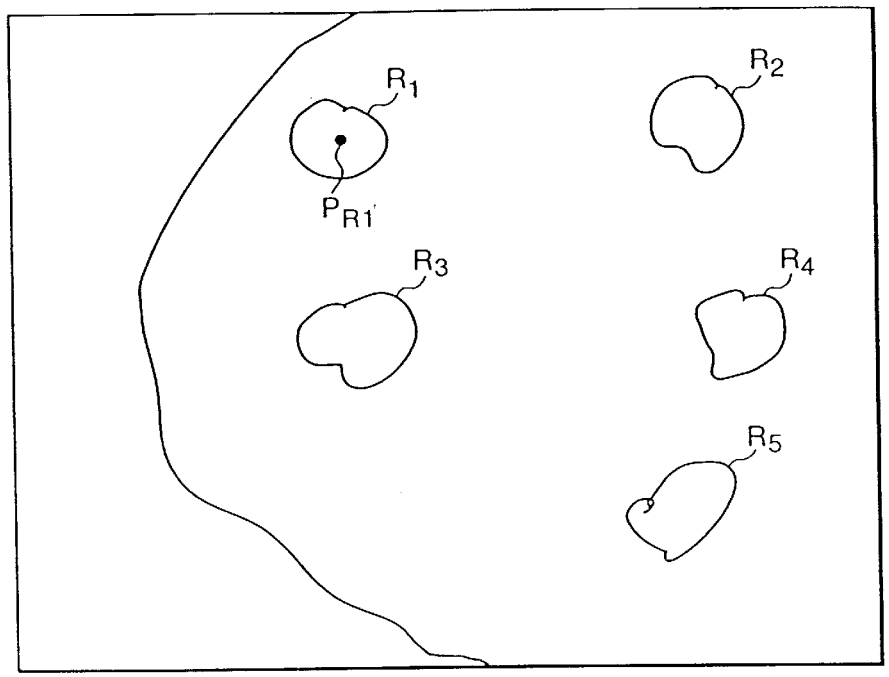
FIGS. 9(a)–9(c) depict an example of an image being processed according to the present invention.
Figure 9B:
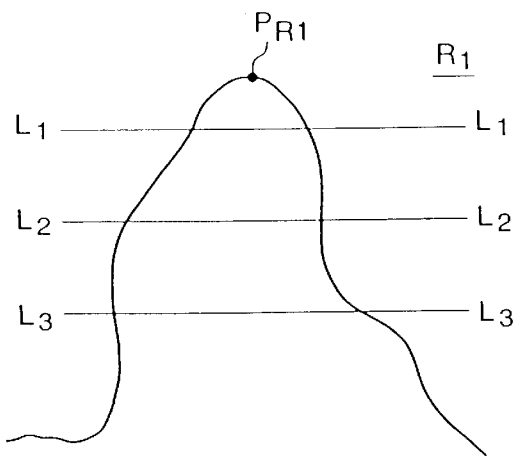
Figure 9C:
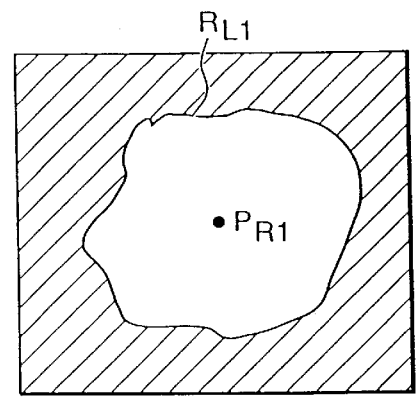

The above processing can be demonstrated with reference to FIGS. 9(*a*)–9(*c*), wherein FIG. 9(*a*) represents a digital radiograph of a human breast (a mammogram). This image is analyzed as follows:

First the image is obtained (step S600) and all suspicious regions ($R_1$–$R_5$) in the image are located (step S610). Then, for each suspicious region, i.e., for each of regions $R_1$ to $R_5$, a start point is found (step S640). For example, for suspicious region $R_1$, the start point $P_{R1}$ is found (step S640), following which the various layers for the region $R_1$ are extracted (step S650). Region $R_1$ is shown in cross-section in FIG. 9(*b*) and the first layer (corresponding to line $L_1$—$L_1$ in FIG. 9(*b*)) is shown in FIG. 9(*c*).

For each layer the features for that layer are determined. Then the rules are applied to the features in order to determine whether or not the suspicious region is a true-positive region (step S670).

Increased Robustness

In order to increase the robustness of the CAD scheme, whenever a new image is being processed, the image is subject to repeated analyses after minor modification of the digital values' distribution. Every suspicious region is computed several times (e.g., ten times) after digital values are modified (noise is added or the image is re-digitized). The multiple CAD scheme results thus obtained are then used as an input to a statistical computation as to whether or not the region is abnormal.

Figure 7:
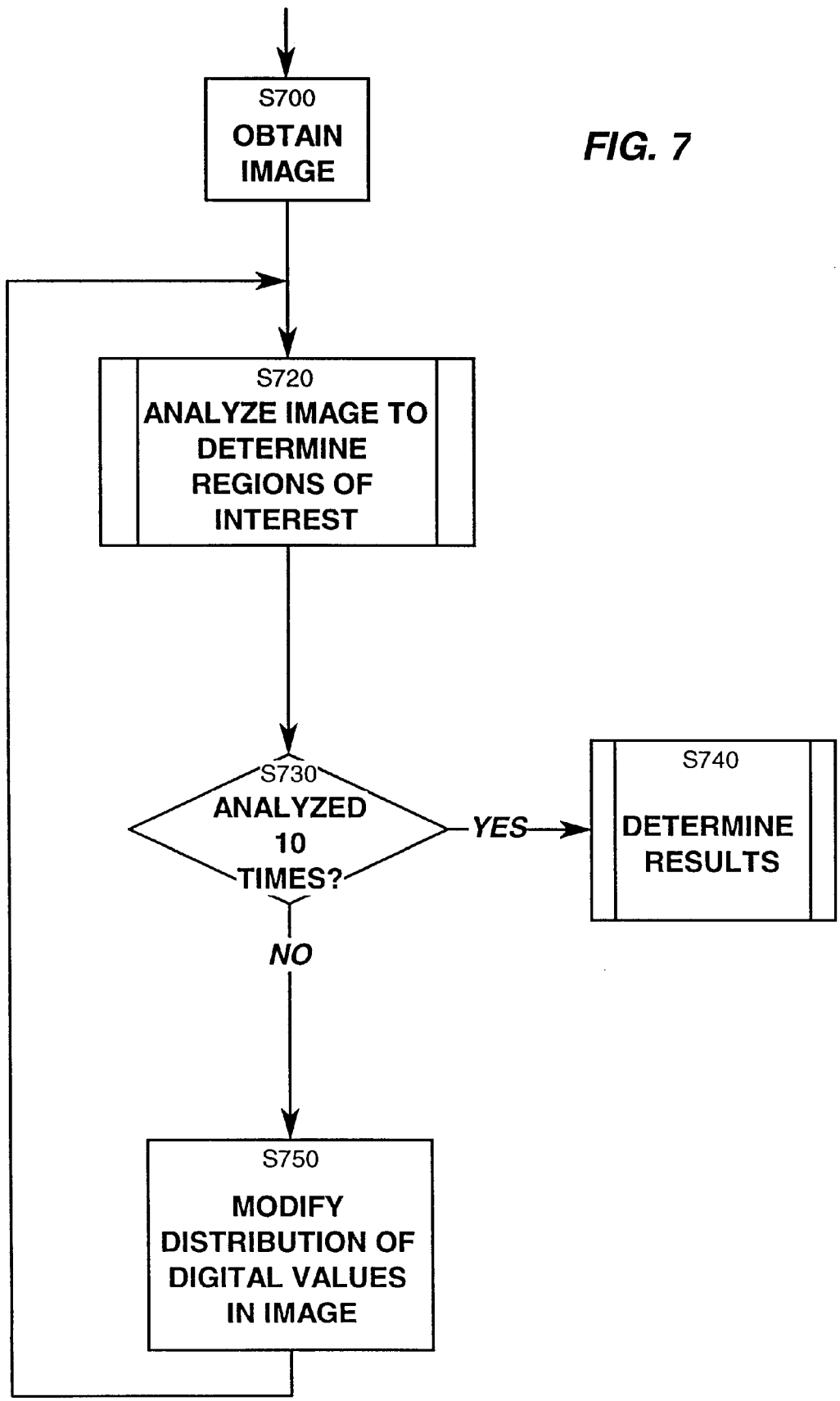

Thus, using, for example, the above steps for processing a new image, the robust approach operates as follows (with reference to FIG. 7):

First, an image is obtained (step S700). Then the image is analyzed (using a CAD scheme such as described above with reference to FIG. 6) and a list of regions of interest (suspicious regions) is determined (step S720).

If it is then determined that the image has been processed a predetermined number of times (for example, ten times) (step S730), then the results of the processing are determined (step S740).

Otherwise, if the image has not yet been processed a predetermined number of times (step S730), the distribution of digital values in the image is modified (step S750) and then the image is re-analyzed (step S720).

The process of determining the results (step S740) requires using a statistical computation of the probability that each region is normal or abnormal. In preferred embodiments a probability is determined for to each region and a rule is applied to that probability. For example, if a region is identified as abnormal more than 70% of the time, it may be classified as positive, otherwise it may be classified as negative. The choice of probability can be determined by applying this repeated technique during a rule-setting phase on a database of known images.

Further Enhancement

Figure 8:
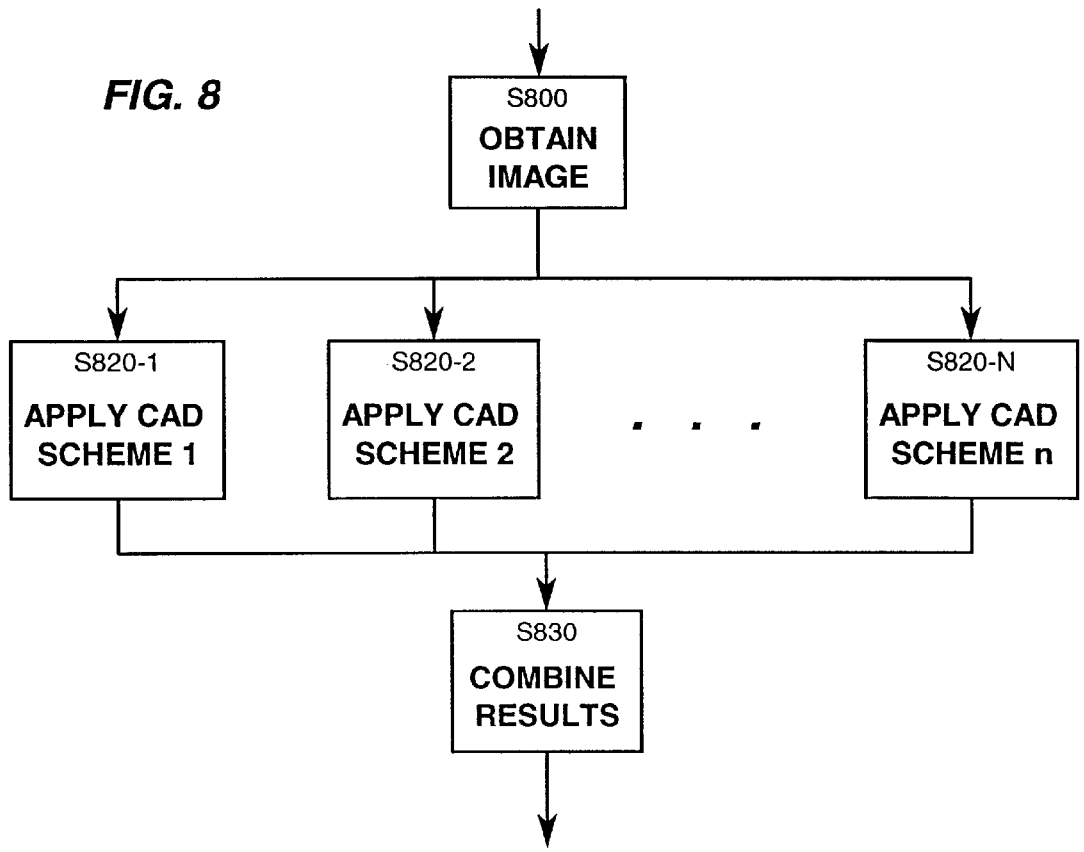

In still a further enhancement, two or more partially correlated CAD schemes are used to increase signal-to-noise ratio. With reference to FIG. 8, each new image is processed by at least two partially correlated CAD schemes and the results are combined using either a logical "AND" or a logical "OR" condition or rule (e.g., the weighted combination of a rule-based and a neuronet-based CAD scheme). By logical "AND" combining it is meant that a region is considered suspect only if all CAD schemes consider it to be suspect. By logical "OR" combining it is meant that a region is considered suspect if any CAD scheme considers it to be suspect.

If the output of an individual scheme is non-binary and is correlated with the probability of the region being actually abnormal, then a weighted logical "AND" or logical "OR" can be used.

Thus, first a new image is obtained (step S800), and then this image is processed by at least two CAD schemes (steps S820-1, 8820-2, S820-n). The results of these CAD schemes are then combined (step S830) using, for example, either logical "AND" or logical "OR" combining rules.

Results

Results from experiments using the present invention are described.

The first experiment demonstrates the performance of multilayer topographic feature analysis implemented in the CAD scheme. The image database involved a total of 428 images with 220 verified masses. The CAD performance in this experiment is summarized in TABLE I (below). In order to yield such performance, 12 pairs of topographic feature components were selected. Every boundary condition and its ability to reduce the number of false positive detections in this image database of 12 pairs of feature components are demonstrated in TABLE II (below). TABLE II shows the non-linear boundary conditions of multilayer topographic feature analysis implemented in the CAD scheme and the performance of each boundary condition in reducing the false positive detections. Initial false positive detections before using topographic feature analysis in this image database is 1,015, which is reduced to 335 by the following twelve (12) non-linear boundary conditions or rules.

RULES

1. Contrast vs. standard deviation in the 3rd layer ($V_{3,4}$ v. $V_{3,5}$)

$$V_{3,5}<13.4V_{3,4}^2-2.61V_{3,4}+0.32;$$

and $$V_{3,5}<0.48 \text{ if } V_{3,4}<0.4$$

2. Shape factor vs. longest axis in the 3rd layer ($V_{3,2}$ v. $V_{3,3}$)

$$V_{3,3}>0.126V_{3,2}^2+0.764V_{3,2}-0.095,$$

and $$V_{3,3}<0.6. \text{ if } V_{3,2}<0.4.$$

3. Size vs. Contrast in the 1st layer ($V_{1,1}$ v. $V_{1,4}$)

$$V_{1,4}>0.226-0.4V_{1,1};$$

and $$V_{1,4}>0.2, \text{ if } V_{1,1}>0.4.$$

4. Growth ratio between the 1st and 2nd layers vs. Growth ratio between the 2nd and 3rd layers ($V_{2,7}$ v. $V_{3,7}$)

$$V_{3,7}<-26V_{2,7}^2+14.2V_{2,7}-1.45;$$

and $$V_{3,7}>0.58V_{2,7}^2+0.67V_{2,7}+0.033.$$

5. Shape factor in the 2nd layer vs. central position shift between 1st and 2nd layer ($V_{2,2}$ v. $V_{2,8}$)

$$V_{2,8}>0.1, \text{ if } V_{2,2}>0.4;$$

and $$V_{2,8}<0.3, \text{ if } V_{2,2}>0.35.$$

6. Contrast in the 1st layer vs. central position shift between the 1st and 2nd layer ($V_{1,4}$ v. $V_{2,8}$).

$$V_{2,8}<0.13, \text{ if } V_{1,4}<0.27,$$

and $$V_{2,8}<0.04, \text{ if } V_{1,4}<0.2.$$

7. Growth ratio between the 2nd and 3rd layers vs. skewness in the 2nd layer ($V_{3,7}$ v. $V_{2,6}$)

$$V_{2,6}>-2.5, \text{ if } V_{3,7}>0.28;$$

and $$V_{2,6}>-9.0, \text{ if } V_{3,7}<0.21.$$

8. Growth ratio between the 2nd and 3rd layers vs. standard deviation in the 1st layer $V_{3,7}$ v. $V_{1,5}$)

$$V_{1,5}<8.28V_{3,7}^2-5.24V_{3,7}+1.08;$$

and $$V_{1,5}<0.25, \text{ if } V_{3,7}>0.36.$$

9. Shape factor in the 2nd layer vs. skewness in the 3rd layer ($V_{2,2}$ v. $V_{3,6}$)

$$V_{3,6}>-12.9V_{2,2}^2+15.4V_{2,2}-5.2, \text{ if } x>0.275;$$

else $$V_{3,6}>357V_{2,2}^2+0.71V_{2,2}-28.4.$$

10. Shape factor in the 2nd layer vs. shape factor in the 3rd layer ($V_{2,2}$ v. $V_{3,2}$)

$$V_{3,2}<-2.27V_{2,2}^2+2.76V_{2,2}-0.09,$$

and $$V_{3,2}>1.7V_{2,2}-0.47.$$

11. Standard deviation in the 1st layer vs. longest axis in the 2nd layer ($V_{1,5}$ v. $V_{2,3}$)

$$V_{2,3}<-5.82V_{1,5}^2+3.1V_{1,5}+0.2,$$

and $$V_{2,3}>13.3V_{1,5}-4.75.$$

12. Contrast in the 1st layer vs. skewness in the 2nd layer ($V_{1,4}$ v. $V_{2,6}$)

$$V_{2,6}>157V_{1,4}^2-135V_{1,4}+14, \text{ if } V_{1,4}<0.7.$$

Rules 1 to 3 are intra-layer rules, using feature components in the same layer; rules 4 to 8 relate to the growth ratio and central position shift between adjacent layers; and rules 9 to 12 are inter-layer rules, selecting different feature components within different layers.

Rules (or boundary conditions) 1, 2, 4, and 8–12 are non-linear. So, for example, rule 11 is a multi-variate (the two variables are contrast and skewness), inter-layer (layers 1 and 2), non-linear (of the form $ax^2+bx+c$) rule.

TABLE I

The experimental results of mass detection using a CAD scheme with multilayer topographic feature analysis.

| CAD Performanae On Mass Detection | Image Database |
|---|---|
| Total Images | 428 |
| Verified Mass Cases | 220 |
| Total Mass Detected By The CAD Scheme | 211 |
| Detection Sensitivity | 95.9% |

TABLE I-continued

The experimental results of mass detection using a CAD scheme with multilayer topographic feature analysis.

| CAD Performanae On Mass Detection | Image Database |
|---|---|
| Total False Positive (FP) Detections | 339 |
| Ratio of FPs Per Image | 0.79 |
| Images Without a FP | 211 |
| Percentage Of Images Without a FP | 49.3% |

TABLE II

Twelve rules (boundary conditions) and their effects

| Rule No. | Reduction Of False Positives |
|---|---|
| 1 | 264 |
| 2 | 171 |
| 3 | 133 |
| 4 | 135 |
| 5 | 137 |
| 6 | 116 |
| 7 | 229 |
| 8 | 168 |
| 9 | 309 |
| 10 | 114 |
| 11 | 95 |
| 12 | 214 |

Note that there is significant overlap between regions eliminated by different boundary conditions.

In a second experiment, two independent CAD schemes, CAD-1 (the CAD scheme of the present invention as described herein) and CAD-2, an independent scheme, were applied to a total of 428 images with 220 verified masses. TABLE III below summarizes the comparison of CAD-1 and CAD-2.

These results indicate that signal-to-noise can be improved by combining two independent methods. The logical "OR" combining rule gives 100% sensitivity with a false-positive detection rate of 2.07 per image, whereas the logical "AND" combining rule has a lower detection sensitivity (89.5%) but has a much lower false-positive detection rate (0.40 per image). Thus, high-sensitivity can be traded off with high-specificity. In either case, depending on the desired characteristics of the results (i.e., high sensitivity or high specificity) the combined technique provides a significant improvement over either CAD method alone. Note that any two independent CAD schemes can be used.

TABLE III

Comparison of two CAD schemes

| CAD performance | CAD-1 | CAD-2 | CAD-1 "OR" CAD-2 | CAD-1 "AND" CAD-2 |
|---|---|---|---|---|
| True-positive detections | 211 | 206 | 220 | 197 |
| Detection sensitivity | 95.9% | 93.6% | 100% | 89.5% |
| False-positive detections | 339 | 719 | 885 | 173 |
| False-positive detection rate per image | 0.79 | 1.69 | 2.07 | 0.40 |

While the above method and system have been described for the detection of masses and microcalcifications in mammograms, it will be appreciated that the present invention can be used for different types of applications and for different types of exams. For example, the present invention can be so used for detecting nodules in chest x-rays, masses in computed tomography of the liver and the like.

Thus, a method and system for enhanced robust identification of abnormal regions in radiographs is provided. One skilled in the art will appreciate that the present invention can be practiced by other than the described embodiments, which are presented for purposes of illustration and not limitation, and the present invention is limited only by the claims that follow.

What is claimed is:

1. A method of detecting abnormal regions in living tissue depicted in a radiograph, the method comprising:

(A) digitizing the radiograph to produce a digitized radiograph; and, by computer, (B) modifying the distribution of the digital values in the digitized radiograph;

(C) identifying any suspected abnormal regions depicted in the modified digitized radiograph;

(D) repeating the modifying and the identifying a fixed number of times; and then (E) making a determination as to whether each suspected abnormal region is an actual abnormal region using the results obtained in steps (B)–(D).

2. A method as in claim 1, wherein said fixed number of times is at least ten, and wherein a given region is considered to be abnormal in the making of the determination if the region is found to be abnormal seven or more times out of said ten times.

3. A method as in claim 1, wherein the modifying of the distribution comprises redigitizing the image.

4. A method as in claim 1, wherein the modifying of the distribution comprises adding noise to the image.

5. An apparatus for detecting abnormal regions in living tissue depicted in a digital radiograph, the apparatus comprising:

means for modifying distribution of digital values in the radiograph to produce a modified radiograph;

means for identifying suspected abnormal regions depicted in the modified radiograph; and means for making a probabalistic determination as to whether each suspected abnormal region is an abnormal region based on a number of times said suspected abnormal region is identified by said identifying means.

6. A system for detecting an abnormal region in living tissue depicted in a digital radiograph, the system comprising a processor programmed to perform the steps of:

(A) obtaining a digitized radiograph;

(B) modifying the distribution of the digital values in the digitized radiograph;

(C) identifying any suspected abnormal regions depicted in the radiograph produced in step (B);

(D) repeating steps (B) and (C) a fixed number of times, and then (E) making a determination as to whether each suspected abnormal region is an actual abnormal region using the results obtained in steps (B)–(D).

7. A system as in claim 6, wherein the step of modifying the distribution comprises one of:

(a) redigitizing the image, and (b) adding noise to the image.

8. A system as in claim 6 wherein the radiograph is a chest X-ray and wherein the abnormal regions depict nodules.

9. A system as in claim 6 wherein the radiograph is produced from computed tomography and wherein the abnormal regions depict masses.

10. A system as in claim 6 wherein the radiograph is a mammogram and wherein the abnormal regions depict masses or clustered microcalcifications.

\* \* \* \* \*